United States Patent [19]

Lauble et al.

[11] Patent Number: 5,999,377
[45] Date of Patent: Dec. 7, 1999

[54] HOLDING DEVICE FOR STATIONARY ARRANGED WRITE/READ HEADS OF A RECORDER

[75] Inventors: Erhard Lauble, St. Georgen; Klaus Oldermann, Villingen-Schwenningen; Fritz Weisser, St. Georgen, all of Germany

[73] Assignee: Deutsche Thomson Brandt GmbH, Villingen-Schwenningen, Germany

[21] Appl. No.: 08/847,027

[22] Filed: May 1, 1997

[30] Foreign Application Priority Data

May 8, 1996 [DE] Germany ............... 196 18 433

[51] Int. Cl.⁶ ....................................... G11B 5/56
[52] U.S. Cl. ........................................... 360/109
[58] Field of Search ................. 360/104, 109; 369/215, 219

[56] References Cited

U.S. PATENT DOCUMENTS

| | | | |
|---|---|---|---|
| 4,329,723 | 5/1982 | Schoenmakers | 360/109 |
| 4,485,420 | 11/1984 | Schoenmakers | 360/109 X |
| 4,589,040 | 5/1986 | Kawase | 360/109 |
| 4,875,122 | 10/1989 | Daniels et al. | 360/109 |
| 5,264,979 | 11/1993 | Schandl et al. | 360/109 |
| 5,572,389 | 11/1996 | Lee | 360/109 |
| 5,703,737 | 12/1997 | Katohno et al. | 360/109 |

FOREIGN PATENT DOCUMENTS 4-139612  5/1992  Japan .

OTHER PUBLICATIONS

Patent Abstracts of Japan JP 6–267045A P–1848, Dec. 22, 1994, vol. 18, No. 685.

*Primary Examiner*—William R. Korzuch
*Attorney, Agent, or Firm*—Joseph S. Tripoli; Joseph J. Laks; Sammy S. Henig

[57] ABSTRACT

A head carrier plate is pressed in the direction of the longitudinal axis of the videotape by spring force against stops. The audio control head bears with its lower edge on a support which simultaneously serves as a tape guide of the lower edge of the videotape and as a pivotal support for the audio control head. Only two setting screws are then necessary, with which the head carrier plate can be set in terms of the angle of inclination with respect to the capstan shaft and in terms of the angle of inclination with respect to the longitudinal axis of the videotape.

5 Claims, 2 Drawing Sheets

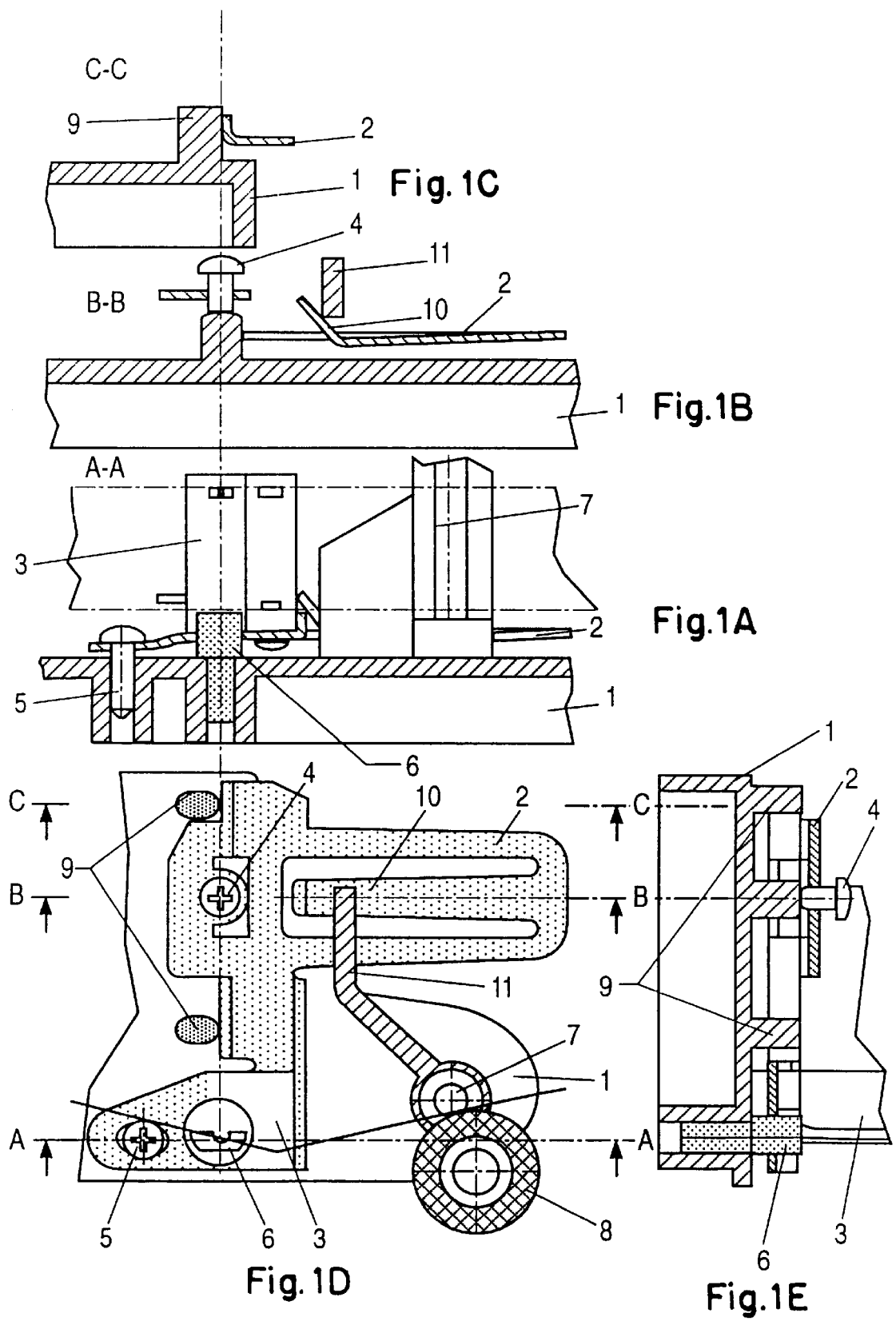

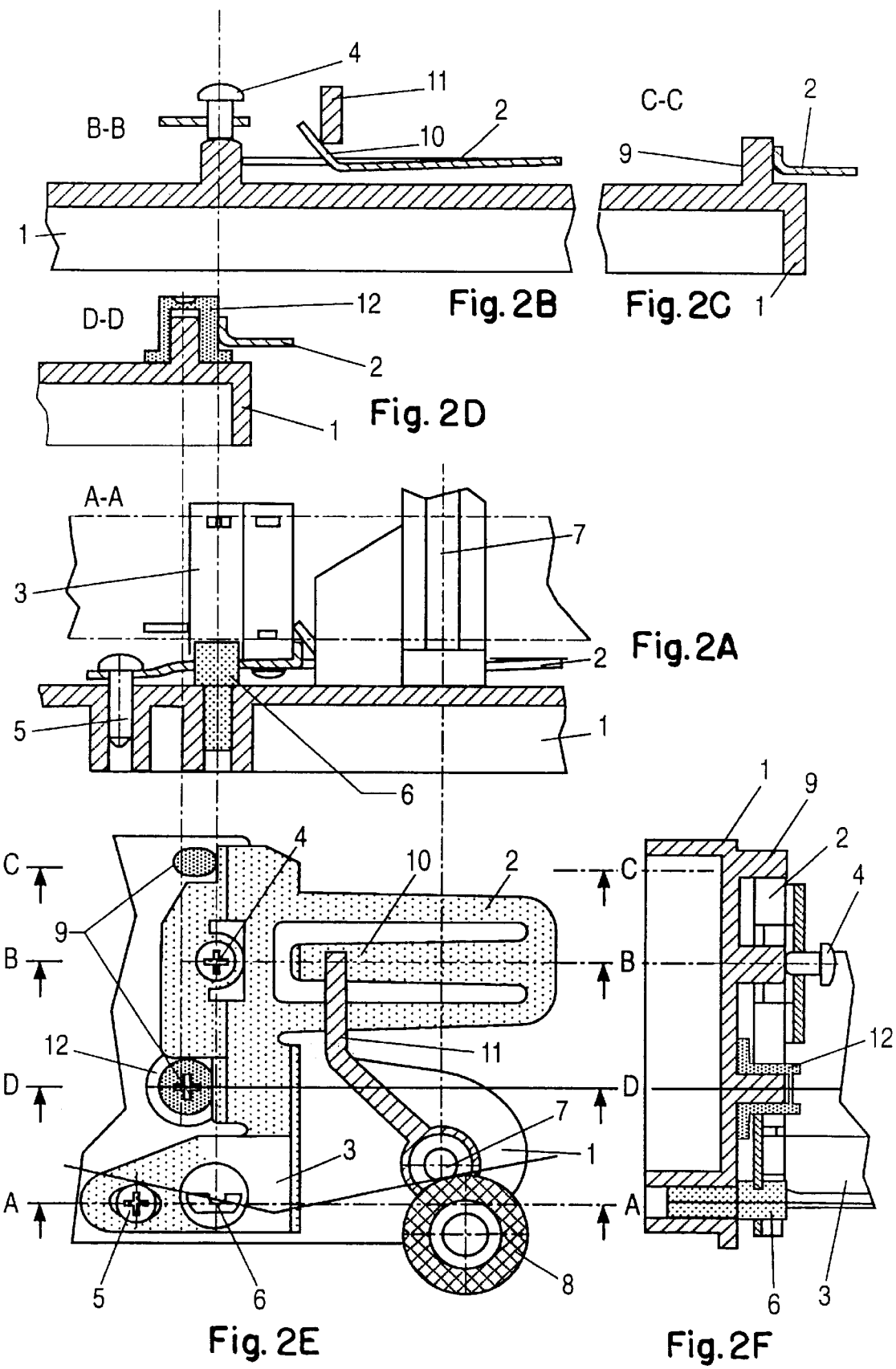

HOLDING DEVICE FOR STATIONARY ARRANGED WRITE/READ HEADS OF A RECORDER

BACKGROUND OF THE INVENTION

The invention relates to a holding device for an audio control head of a video recorder.

In video recorders according to the VHS system, the recording of video signals and stereo audio signals takes place in slanted tracks by means of a rotating video head and the recording of control signals and mono audio signals takes place in longitudinal tracks by means of a stationary audio control head.

In order to ensure compatibility between video recorders and prerecorded videotapes, it is necessary to adjust the audio control head with regard to the recording track of the videotape. Use is made for this purpose of tape guides, screws and helical springs which enable the setting of the position of a head carrier plate with respect to a baseplate and the tape guides and fix the setting position. The angle of inclination of the audio control head with respect to the capstan shaft (tilt angle), the angle of inclination of the head gaps of the audio control head with respect to the longitudinal axis of the videotape (azimuth angle), the relative height of the audio control head with respect to the edge of the videotape and, if appropriate, the so-called X distance can be set. The known holding devices have a multiplicity of individual parts and require, owing to the multiplicity of setting elements, a comparatively long time for carrying out the settings, since the setting measures in some instances mutually influence one another.

SUMMARY OF THE INVENTION

The invention is based on the object of providing a holding device for an audio control head of a video recorder which manages with fewer setting elements and enables time-saving setting to a large extent without the setting measures having a mutual influence on one another.

Since the audio control head bears with its lower edge on a support which simultaneously serves as tape guide of the lower edge of the videotape, the height guidance which is otherwise necessary is dispensed with. At the same time, the necessity of setting the audio control head in terms of height to the videotape is also dispensed with, since head and tape use the same height reference.

The stops against which the head carrier plate is pressed in the direction of the longitudinal axis of the videotape by spring force also produce a reference for the X distance. Small, production-dictated X setting tolerances can be electronically compensated for in normal equipment.

Consequently, only the setting of the angle of inclination with respect to the capstan shaft and of the angle of inclination of the head gaps of the audio control head with respect to the longitudinal axis of the videotape are then necessary. Since the audio control head is in this case tilted about its bearing point on the support, the two setting measures, which, after all, take place at right angles to one another, do not mutually influence one another. The time saved during the setting operation results, on the one hand, from the fact that only two setting elements now have to be operated and, on the other hand, from the fact that no influencing takes place, with the result that each setting operation only has to be carried out once.

The head carrier plate is preferably composed of a resilient material. The head carrier plate is, on the one hand, braced against the baseplate by means of a holder and a screw and, on the other hand, held at a distance from the baseplate by means of the support and a further screw. The screws are additionally used for the setting of the head carrier plate in that the angle of inclination with respect to the capstan shaft can be set by means of a screw which is perpendicular to the capstan shaft and to the longitudinal axis of the videotape, and the angle of inclination with respect to the longitudinal axis of the videotape can be set by means of a screw which is situated in the direction of the longitudinal axis of the videotape.

The head carrier plate is therefore pressed against the baseplate by means of two elements and held at a distance by means of two further elements. This results in a defined position. The configuration of the head carrier plate from a resilient material renders the use of separate springs, as provided by the prior art, superfluous.

The position of the screws with regard to the support is chosen in such a way that imaginary connecting lines between the support and the screws form a right angle. As a result, the settings of the angles of inclinaton are not mutually influenced.

A spring tongue having a slanted stop surface compared with the head carrier plate can be formed, through a recess in the head carrier plate through a recess in the head carrier plate against which stop surface the holder presses. In this case, force components against the stops and against the baseplate are exerted simultaneously on the head carrier plate. In this way, success is achieved in generating two force components with the same spring.

A development provides for one of the stops to be adjustable. The adjustable stop may in this case have an eccentric screw. This measure makes it possible also to carry out coarse setting of the X distance, which is necessary in equipment having a still frame mechanism.

The invention is explained below using two exemplary embodiments which are illustrated in the drawing, in which:

BRIEF DESCRIPTION OF THE DRAWINGS

FIGS. 1A–1E referred collectively as FIG. 1 shows a plan view of a holding device of a first design and also sections through the holding device, and FIGS. 2A–2F referred collectively as FIG. 2 shows a plan view of a holding device of a second design and also sections through the holding device.

DESCRIPTION OF THE PREFERRED EMBODIMENT

The holding devices illustrated in the drawing comprise a baseplate 1 on which a head carrier plate 2 is fastened in such a manner that it can be set. FIG. 1 and FIG. 2 show plan views of the holding device according to a first embodiment and a second embodiment, respectively. Vertical sections are taken along intersection lines A—A, B—B, C—C and D—D in the respective plan view. Another vertical section is, respectively, shown in FIG. 1 and FIG. 2 taken along a line in the respective plan view through the center of support 6 and a screw 4. On the baseplate 1, furthermore, there is mounted a capstan shaft 7 with a pinch roller 8 and there are fastened a holder 11 as well as the support 6 and stops. In the design shown in FIG. 1, there are two fixed stops 9. The design according to FIG. 2 comprises one fixed stop 9 and one adjustable stop 12. The adjustable stop 12 may be formed by an eccentric screw which is arranged on the baseplate 1. The head carrier plate 2 carries an audio control head 3. In a region facing away from the stops 9 and 12, the head carrier plate 2 has an attachment in which a spring tongue 10 is formed through a recess. The spring tongue 10 is beveled at its end facing the stops 9 and 12 and is engaged with the holder 11.

In the region between the stops 9; 12, the head carrier plate 2 is penetrated by a screw 4. The screw 4 is mounted such that it can rotate in a thread of the head carrier plate 2 and is supported on a projection of the baseplate 1. A further screw 5 penetrates the head carrier plate 2 with radial play and is mounted in a thread of the baseplate 1.

The holder 11 presses on the bevelled end of the spring tongue 10 and in this way exerts force components which press the head carrier plate 2 against the stops 9; 12, on the one hand, and, on the other hand, against the support 6 and, via the screw 4, against the projection on the baseplate 1. The screw 5 also exerts a force component with its screw head, which force component presses the head carrier plate 2 against the baseplate 1. The head carrier plate 2 is thus unambiguously positioned with regard to the stops 9; 12 and the support 6.

The points of engagement of the screws 4 and 5 on the head carrier plate 2 are situated with regard to the support 6 in such a way that imaginary connecting lines between the screw 4 and the support 6, on the one hand, and between the screw 5 and the support 6, on the other hand, form a right angle. As a result, when the screw 4 is actuated, the head carrier plate 2 pivots with the audio control head 3 about an axis which corresponds to the connecting line between the screw 5 and the support 6, and when the screw 5 is actuated, the head carrier plate 2 pivots with the audio control head 3 about an axis which corresponds to the connecting line between the screw 4 and the support 6. Since the pivot axes are thus likewise at a right angle with respect to one another, the settings do not mutually influence one another or at least lie within the permissible tolerance range.

During the setting operation, the angle of inclination of the audio control head 3 with respect to the capstan shaft 7, referred to as the tilt angle, is first of all set by means of the screw 4 so that the videotape, which rests with its lower edge on the support 6, runs parallel from the capstan shaft 7 along all the gaps of the partial heads of the audio control head 3 and, consequently, the heads assigned to the same track are in fact situated in the same track. The angle of inclination of the head gaps of the audio control head 3 with respect to the tape axis, referred to as azimuth angle, is subsequently set by means of the screw 5. This concludes the setting operation.

In the design according to FIG. 2, the X distance can additionally be set by means of the adjustable stop 12, in order to be able to undertake X-distance setting even in equipment having a still frame mechanism.

We claim:

1. A holding device for an audio control head of a video recorder having a capstan shaft, comprising a baseplate, and a head carrier plate which is set with respect to the baseplate and holds the audio control head, wherein the head carrier plate is pressed in the direction of the longitudinal axis of a videotape by spring force against a plurality of stops, wherein the audio control head bears with a lower edge thereof on a support which simultaneously serves as a tape guide for a lower edge of the videotape and as a pivotal support for the audio control head, and wherein the position of the head carrier plate is adjustable in terms of the angle of inclination with respect to the capstan shaft by a first setting screw and in terms of the angle of inclination with respect to the longitudinal axis of the videotape by a second setting screw, such that adjustment of at least one of said screws causes said audio control head to tilt relative to said support.

2. The holding device according to claim 1, wherein the head carrier plate is composed of a resilient material, wherein the head carrier plate is, on the one hand, braced against the baseplate by a holder and the second setting screw and, on the other hand, is held at a distance from the baseplate by the support and the first setting screw, and wherein the first and second screws are additionally used for the setting of the head carrier plate wherein the angle of inclination with respect to the capstan shaft is adjustable by the first setting screw having a rotational axis which is parallel to the capstan shaft and perpendicular to the longitudinal axis of the videotape, and the angle of inclination with respect to the longitudinal axis of the videotape is adjustable by the second setting screw having a rotational axis which is perpendicular to the longitudinal axis of the videotape.

3. The holding device according to claim 2, wherein a spring tongue having a slanted stop surface is formed through a recess in the head carrier plate, against which stop surface the holder presses and simultaneously exerts a force component against the stops and against the baseplate.

4. The holding device according to claim 1 wherein one of the stops is adjustable such that the audio control head is moved parallel to the longitudinal axis of the videotape.

5. The holding device according to claim 4, wherein the adjustable stop has an eccentric screw.

* * * * *